(12) United States Patent
Kroizer et al.

(10) Patent No.: US 12,418,259 B1
(45) Date of Patent: Sep. 16, 2025

(54) DRIVE SYSTEM FOR PHOTOVOLTAIC TRACKERS

(71) Applicant: SOLARGIK LTD, Jerusalem (IL)

(72) Inventors: Israel Kroizer, Jerusalem (IL); Gil Kroyzer, Jerusalem (IL); Eyal Rosenwein, Ness Ziona (IL); Efrat Zocher Arica, Jeruslaem (IL); Morag Am-Shallem, Jerusalem (IL); Boaz Grosman, Mevaseret Zion (IL); Yehoshua Grantz, Mevaseret Zion (IL)

(73) Assignee: SOLARGIK LTD, Jerusalem (IL)

( * ) Notice: Subject to any disclaimer, the term of this patent is extended or adjusted under 35 U.S.C. 154(b) by 6 days.

(21) Appl. No.: 18/607,482

(22) Filed: Mar. 17, 2024

(51) Int. Cl.
*H02S 20/32* (2014.01)

(52) U.S. Cl.
CPC ................... *H02S 20/32* (2014.12)

(58) Field of Classification Search
CPC ....................................... H02S 20/32
See application file for complete search history.

(56) References Cited

U.S. PATENT DOCUMENTS

2022/0278642 A1\* 9/2022 Kumar .................. H02S 20/32

\* cited by examiner

*Primary Examiner* — Jayne L Mershon
(74) *Attorney, Agent, or Firm* — Momentum IP; Marc Van Dyke

(57) ABSTRACT

In a solar energy system, a photovoltaic (PV) assembly includes a frame subassembly and an array of PV panels joined to and pivotable with the frame assembly. A support pylon comprises a hollow member open on a first side. A drive system includes an electric motor and a pivot-wheel assembly comprising a drive chain joined to a hoop portion. The pivot-wheel assembly is arranged to transfer a torque from the electric motor to the frame subassembly. The electric motor is at least partly disposed within the hollow member and is mounted to a wall of the hollow member. A gearing arrangement includes a drive shaft passing through an aperture in the wall so as to place the motor in geared communication with the drive chain via a sprocketed drive wheel.

15 Claims, 4 Drawing Sheets

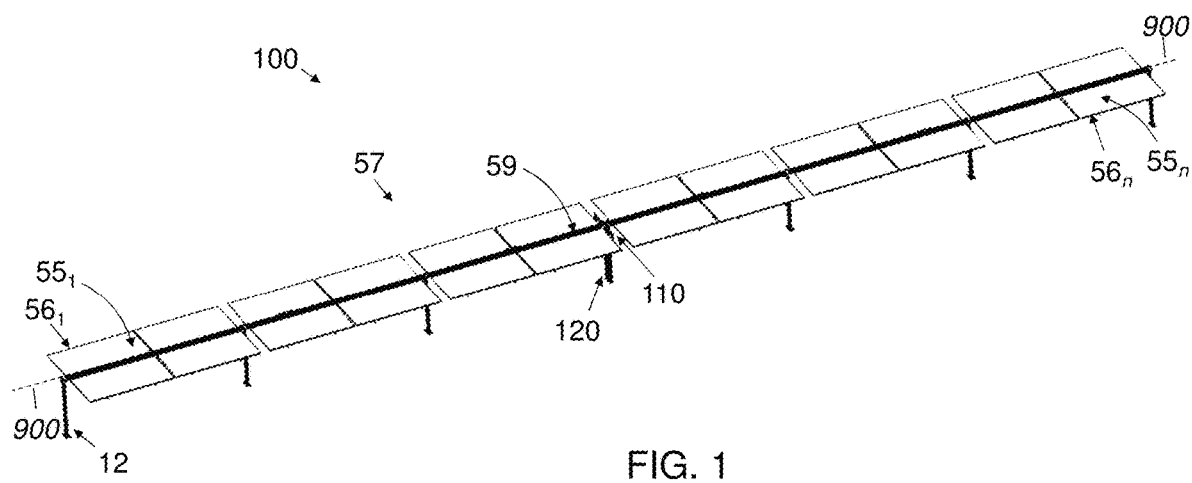
FIG. 1
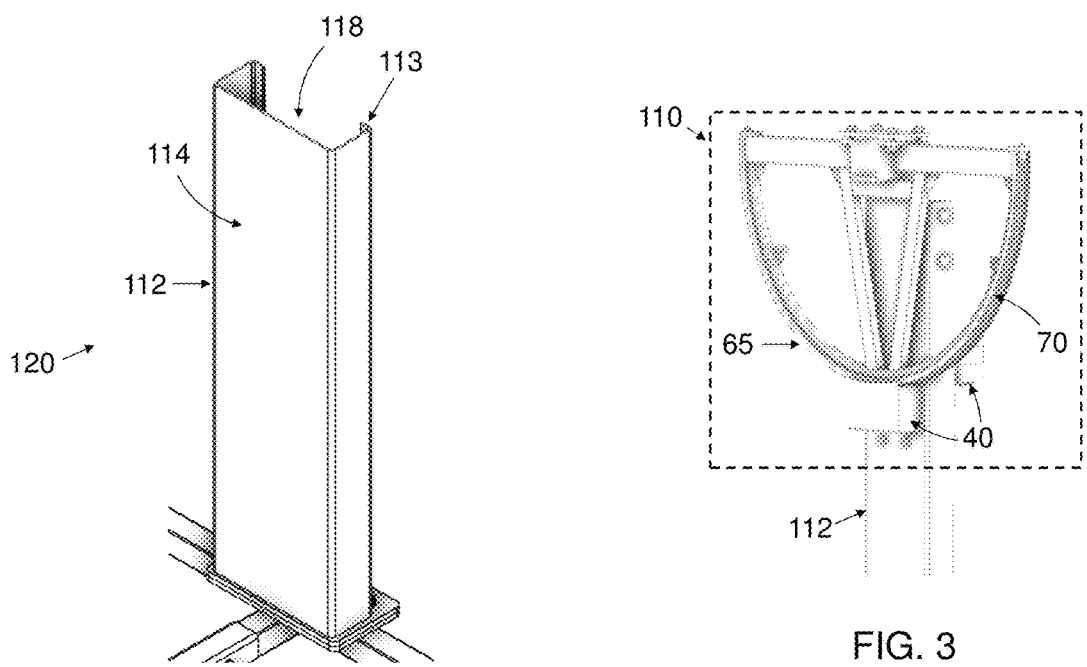
FIG. 2
FIG. 3

Step S01 provide a support pylon 120 comprising a hollow member 112, an electric motor 42 at least partly within the hollow member 112, and a pivot-wheel assembly 50 driven by a drive shaft 35 passing through an aperture 36 in a pylon wall 114

Step S02 provide electricity to rotate the motor 42, wherein the rotating of the motor 42 is effective to pivot the PV assembly 57

FIG. 10

DRIVE SYSTEM FOR PHOTOVOLTAIC TRACKERS

FIELD OF THE INVENTION

The present invention relates to solar energy systems and in particular to drive systems for photovoltaic trackers, methods for their use, and solar energy systems comprising the drive systems.

BACKGROUND

Achieving a diversified low-carbon emissions energy economy has been limited by economic and technological limitations. Solar energy systems comprising photovoltaic (PV) arrays are commonly deployed to capture energy from both direct and diffuse (including reflected) solar irradiance. Tracking PV systems are deployed in which PV arrays are pivoted to reduce the cosine losses of the direct irradiance component, so-called because the energy absorbed is a function of the cosine of the angle.

Commercially available tracking PV systems, known as 'PV trackers', employ heavy-duty drive systems comprising electric motors and typically installed on robust support pylons that bear the load of PV assemblies and withstand the forces associated with pivoting the PV assemblies. For smaller and lighter PV systems, there is a need for a more efficient solution that places the electric motor at, or closer to, the longitudinal axis of the PV assembly. Further, there is a need for a drive system that can be integrated in more lightweight construction, e.g., solar energy system using light steel profiles.

SUMMARY

According to embodiments disclosed herein, a solar energy system comprises: (a) a photovoltaic (PV) assembly comprising a frame subassembly and an array of PV panels joined thereto and pivotable therewith about a longitudinal axis of the PV assembly; (b) a support pylon comprising a hollow member open on a first side; and (c) a drive system comprising (i) a drive-motor assembly comprising an electric motor and a gearing arrangement in communication therewith, and (ii) a pivot-wheel assembly comprising a drive chain joined to a hoop portion, the pivot-wheel assembly arranged to transfer a torque from the electric motor to the frame subassembly. The drive-motor assembly is at least partly disposed within the hollow member and mounted to a wall thereof, and the gearing arrangement comprises a drive shaft passing through an aperture in the wall so as to place the electric motor in geared communication with the drive chain via a sprocketed drive wheel.

In some embodiments, the solar energy system can additionally comprise: (i) a mounting plate disposed within the hollow member and mediating between the drive-motor assembly and the wall, and (ii) a plurality of unpowered guide wheels engaged with the drive chain and coupled to the mounting plate via guide-wheel shafts passing through respective apertures in the wall.

In some embodiments, the wall can be opposite the first side.

In some embodiments, the hollow member can comprise a light steel profile. In some embodiments, the hollow member can comprise one of a C profile and a U profile. In some embodiments, the wall can have a thickness between 0.8 and 3.5 mm. In some embodiments, the wall can have a thickness between 1 and 2 mm.

In some embodiments, a center of mass of the drive-motor assembly can be disposed within the hollow member. In some embodiments, the electric motor can be at least partly disposed within the hollow member. In some embodiments, a center of mass of the electric motor can be disposed within the hollow member.

In some embodiments, operation of the electric motor can be regulated by a control system installed in an enclosure that is at least partly disposed within the hollow member.

According to embodiments disclosed herein, an assembly for use in a solar tracker comprises: (a) an elongated hollow support member, open on a first side; (b) a drive-motor assembly at least partly disposed within the support member and mounted to a wall thereof, the drive-motor assembly comprising an electric motor, a drive shaft and at least one guide-wheel shaft, the shafts passing through respective apertures in the wall so as to connect to respective sprockets disposed outside the support member, the respective sprockets comprising a drive sprocket and at least one guide-wheel sprocket; and (c) a drive chain engaged with the drive sprocket to be driven thereby and with the at least one guidewheel sprocket to be guided thereby.

In some embodiments, the respective apertures can have larger diameters than the shafts passing therethrough, and the shafts do not contact the wall.

In some embodiments, the drive-motor assembly can comprise an even number of guide-wheel shafts disposed symmetrically around a vertical axis of symmetry intersected by a central longitudinal axis of the drive shaft.

A method is disclosed, according to embodiments, for rotating a PV assembly, the PV assembly comprising a frame subassembly and an array of PV panels joined thereto and pivotable therewith about a longitudinal axis of the PV assembly. The method comprises: (a) providing (i) a support pylon comprising a hollow member open on a first side, and (ii) a drive system comprising (A) a pivot-wheel assembly comprising a drive chain joined to a hoop portion, and (B) a drive-motor assembly at least partly disposed within the hollow member and mounted to a wall thereof, the drive-motor assembly comprising an electric motor and a gearing arrangement in communication therewith, the gearing arrangement comprising a drive shaft passing through an aperture in the wall so as to be in geared communication with the drive chain via a sprocketed drive wheel; and (b) providing electricity to rotate the motor, wherein the rotating of the motor causes the pivot-wheel assembly to rotate and transfer a torque to the PV assembly.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 1 is a schematic perspective-view illustration of a photovoltaic (PV) energy system according to embodiments of the present invention.

FIG. 2 is a cutaway perspective view of a support pylon comprising a hollow member, according to embodiments of the present invention.

FIG. 3 is a schematic perspective-view illustration of a drive system mounted to the hollow member of a support pylon, according to embodiments of the present invention.

FIG. 10 shows a flowchart of a method for rotating a PV assembly, according to embodiments of the present invention.

DETAILED DESCRIPTION OF THE ILLUSTRATED EMBODIMENTS

Figure 4:
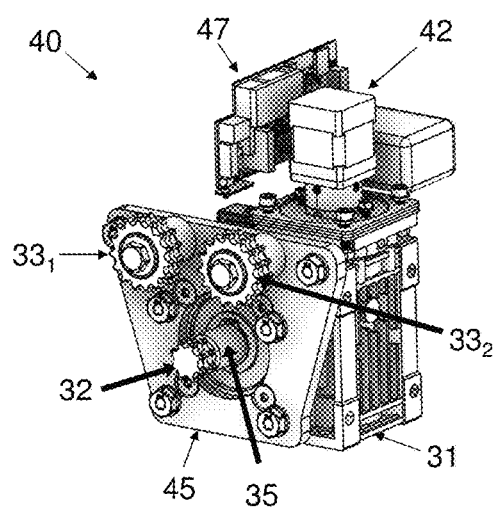
FIG. 4 is a schematic perspective-view illustration of a motor assembly, according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$ or $10_A$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general.

A 'solar energy system' as used herein means a system for generating electricity using an array of photovoltaic (PV) panels or modules. The system can include an inverter for converting the direct-current (DC) electricity generated by the PV modules to alternating current (AC) electricity, e.g., for delivery to an electricity grid. Embodiments disclosed herein relate to apparatuses and systems for operating a solar energy system incorporating a solar tracker. A solar tracker, or simply 'tracker' or 'PV tracker', is an arrangement that changes the attitude of the PV panels so as to capture, i.e., convert, a higher proportion of the direct irradiance falling on the panels over the course of any given period of time by reducing the angle between direct solar radiation and a vector normal to the PV panels. A single-axis tracker is one that rotates PV panels around a single axis, usually from east to west over the course of a day around a north-south axis. Some single-axis trackers are arranged to rotate about an east west axis.

Embodiments of the invention relate to a solar energy system in which the drive system is installed on, and partly within, the steel profile of a support pylon. Inter alia, the position of the drive system in or proximate to the longitudinal and lateral center of the PV assembly is effective to reduce or eliminate shear forces and reduce power consumption. In embodiments, the electric motor and other components are installed in the hollow space of the support pylon, and connect through a wall of the pylon to a pivot-wheel assembly positioned to transfer torque to a central longitudinal member, e.g., torque tube, of the PV assembly and pivot the PV assembly.

Referring now to the figures, and in particular to FIG. 1, a solar energy system 100 according to embodiments includes a PV assembly 57 comprising an array of n PV panels $55_1$ through $55_n$ respectively joined to an array of n frames $56_1$ through $56_n$. A frame assembly includes the frames 56 and a central elongated member 59 to which the frames 56 are joined. The central elongated member 59 serves to transfer a torque, e.g., from an electric motor, to rotate the PV assembly 57, i.e., the frames 56 as a unit, together with the central elongated member 59 and the PV panels 55. The PV assembly 57 rotates about a central longitudinal axis indicated in FIG. 1 by line 900. The central elongated member 59 is pivotably supported by multiple ground supports 12 and by a central support pylon 120 at which the drive system 110 of the solar energy system 100 is installed. The drive system 110, in the illustrated examples described herein, transfers torque to the frame subassembly at a single location along the length of the central elongated member 59, and in such examples the drive system 110 is located at or adjacent to the midpoint of the central elongated member 59.

As can be seen in the cutaway view of the exemplary central support pylon 120 shown in FIG. 2, the support pylon 120 includes a hollow member 112, installed vertically, that is open on one side 113. In some embodiments, the hollow member 112 comprises a light steel profile. As is known in the art, a galvanized cold-formed or cold-rolled 'light steel' (or light-gauge steel) profile is one that has a wall thickness of less than 5 mm, for example between 0.8 mm and 3.5 mm (all ranges herein are inclusive), or between 0.8 mm and 3 mm, or between 0.8 mm and 2.5 mm, or between 0.8 mm and 2 mm, or between 0.8 mm and 1.6 mm, or between 1 mm and 3.5 mm, or between 1 mm and 3 mm, or between 1 mm and 2.5 mm, or between 1 mm and 2 mm, or between 1 mm and 2 mm, or between 1 mm and 1.6 mm. Suitable light-steel profiles include C profiles, like the example shown in FIG. 2, or U profiles. Both C and U profiles include a partly, mostly or completely open side 113, an interior volume 118 enclosed on three sides, and a flat wall 114 opposite the open side 113. For reasons that are discussed hereinbelow, the cross-sectional dimensions of the hollow member 112 are dictated not only by the forces acting upon the support pylon 120, but also by the dimensions of certain components of the drive system 110, such as, without limitation, the drive-motor assembly (or, equivalently, motor assembly) 40, which are at least partly installed within the interior volume 118 of the hollow member 112.

FIG. 3 shows a general view of a drive system 110 mounted to the support pylon 120. The drive system 110 includes a motor assembly 40 mounted to the wall 114 and a pivot-wheel assembly comprising a drive chain 70 joined to a hoop portion 65.

A non-limiting example of a motor assembly 40 is shown in greater detail in FIG. 4. The electric motor 42 according to the example is mounted above a gear housing 31. Electric motors and housings for electric motors are well known in the art, as are gearing arrangements including suitable planetary gears and/or worm gears. A skilled artisan will select a motor, e.g., a stepper motor, and a geartrain suitable for practicing the embodiments in terms of power output, efficiency, backlash and/or lifetime.

On the left side of the drawing, on the 'front' side of the motor assembly, a drive sprocket 32 at the end of a drive shaft 35 is provided in communication with the motor, e.g., via a gear train comprising a planetary gear and/or a worm gear, to engage with the drive chain 70 when mounted on the support pylon 120. In some designs, the drive sprocket 32 and the drive shaft 35 are integrally formed, and in some other designs the drive sprocket 32 is affixed to the drive shaft 35, e.g., by welding or other method of attachment. Two guide-wheel sprockets $33_1$, $33_2$ are provided to engage the drive chain 70 as well, but are not powered and are provided only for guiding the drive chain 70 to and from the drive-wheel sprocket 32. In the non-limiting example of FIG. 4, the guide-wheel sprockets 33 are not connected, even indirectly, to the motor, but rather are coupled to a mounting plate 45. When the drive system 110 is installed on the support pylon 120, the mounting plate 45 mediates between the motor and a wall of the hollow member 112, e.g., the wall.

In some embodiments, the two guide-wheel sprockets 33 are disposed symmetrically around a vertical axis of symmetry intersected by a central longitudinal axis of the drive shaft 35. When the drive system 110 is assembled and installed on the support pylon 120, the drive chain 70 leaves the hoop portion 65, partly circumscribes the first guide-wheel sprocket $33_1$, partly circumscribes the drive sprocket 32, partly circumscribes the second guide-wheel sprocket $33_2$, and returns to the hoop portion 65. The controller 47 in this exemplary design sits above the gear housing 31 alongside the electric motor 42 and is in direct electronic communication therewith.

Figure 5:
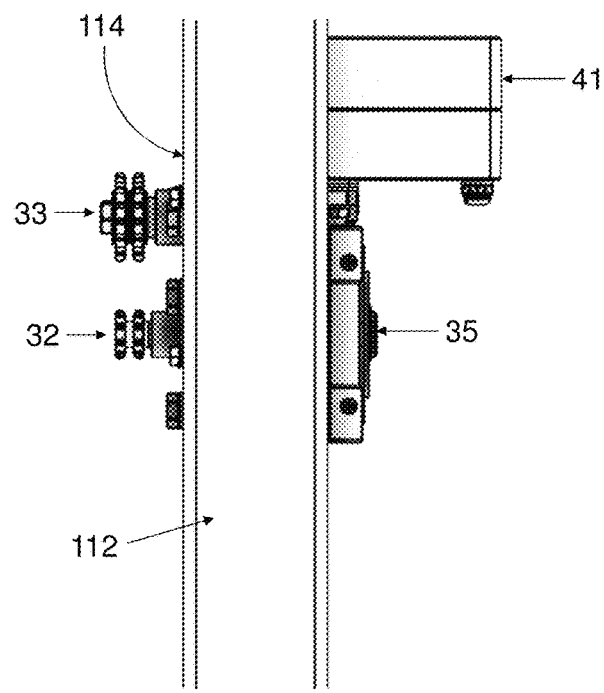
FIGS. 5, 6 and 7 are schematic illustrations of a motor assembly mounted to the hollow member of a support pylon, according to embodiments of the present invention.
Figure 6:
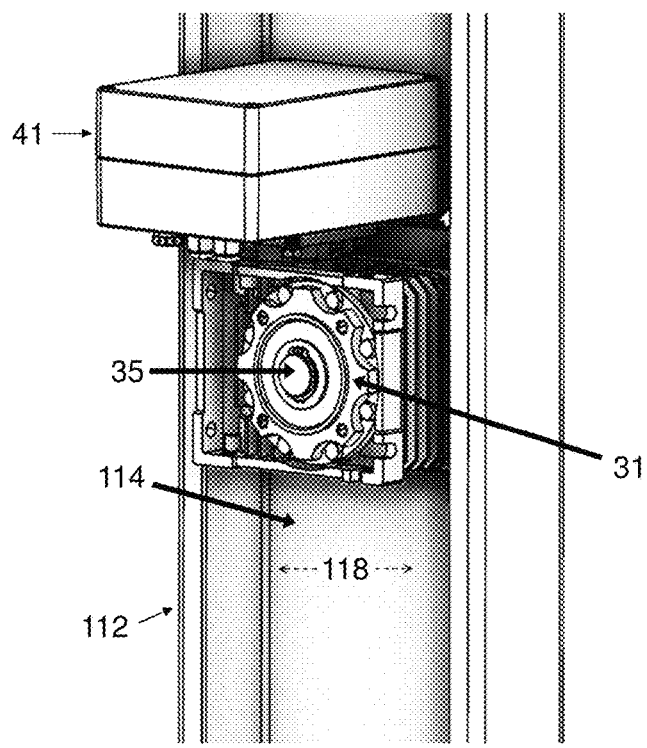
Figure 7:
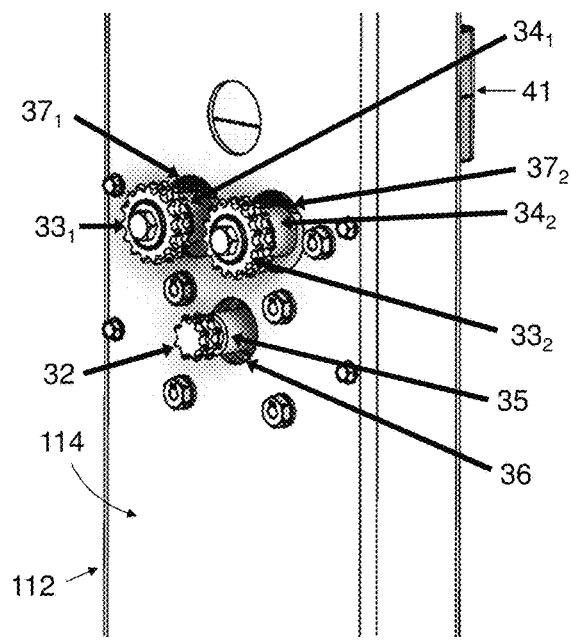

We now refer to FIGS. 5, 6 and 7, which show various views of a drive-motor assembly 40 installed in a hollow member 112 of a support pylon 120, e.g., mounted on a mounting plate 45, according to embodiments.

The side view of FIG. 5 shows the drive sprocket 32 and the guide-wheel sprockets 33 disposed externally to the hollow member 112, such that the wall 114 opposite the open side 113 mediates between the gear housing 31 and the sprockets 32, 33. The motor assembly 40 is mounted to the inward side of the wall 114, such that at least a portion, or at least half, or at least a majority of the motor assembly 40, is disposed within the volume 118 of the hollow member 112. In some embodiments, a center of gravity of the motor assembly 40 is disposed within the hollow member 112. In some embodiments, e.g., as indicated in FIG. 5, the electric motor 42 is at least partly disposed within the volume 118 of the hollow member 112. In some embodiments, a center of gravity of the electric motor 42 is disposed within the hollow member 112. In some embodiments, a center of gravity of the electric motor 42 is disposed within the hollow member 42 and closer to the wall 114 than to the open side 113.

In some examples (not shown), the hollow member 112 is rotated 90° from the position shown such that the motor assembly 40 is mounted to a wall that is not opposite the open wall 113. In other examples, the hollow member 112 is not rectangular, such that the shape of the support pylon 120 or of the hollow member 112 does not limit the scope of the embodiments.

FIG. 6 is a reverse perspective view showing the 'back' of the drive-motor assembly 40. A portion of the drive shaft 31 can be seen at the back of the motor housing 31, i.e., being in communication with the electric motor 42 via a worm gear (not shown). A motor/controller housing 41, which houses the electric motor 42 and the electronic circuitry 47, e.g., the controller, can be partly disposed within the interior volume 118 of the hollow member 112 as well.

FIG. 7 shows further details of the 'front' of the pylon 120, i.e., of wall 114 and the components of the motor assembly 40 that pass through the wall 114 from within the hollow member 112. The drive shaft 35 passes through aperture 36, and ends at the drive sprocket 32 outside the hollow member 112. The guide-wheel shafts $34_1$, $34_2$, pass through respective apertures $37_1$, $37_2$, and end, respectively, at the guide-wheel sprockets $33_1$, $33_2$ outside the hollow member 112. In some designs, the guide-wheel sprockets $33_1$, $33_2$ and the respective guide-wheel shafts $34_1$, $34_2$ are integrally formed, and in some other designs the guide-wheel sprockets $33_1$, $33_2$ are affixed to the respective guide-wheel shafts $34_1$, $34_2$, e.g., by welding or other method of attachment. In some embodiments, the shafts 34, 35 pass through the wall 114 without touching the wall 114. In embodiments, the drive shaft is in mechanical communication, i.e., geared communication, with the electric motor 42. In some embodiments, the guide-wheel shafts 34 are joined to the mounting plate 45 which is disposed within the hollow member 112 between the gear housing 31 and the wall 114.

Figure 8:
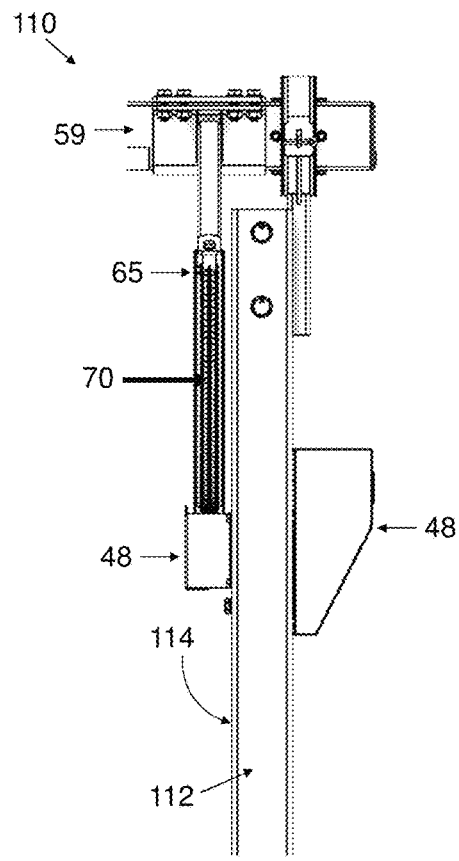
FIGS. 8 and 9 are respective schematic side elevation-view illustrations of a drive system installed on a support pylon, with and without environmental housings covering the motor assembly, according to embodiments of the present invention.
Figure 9:
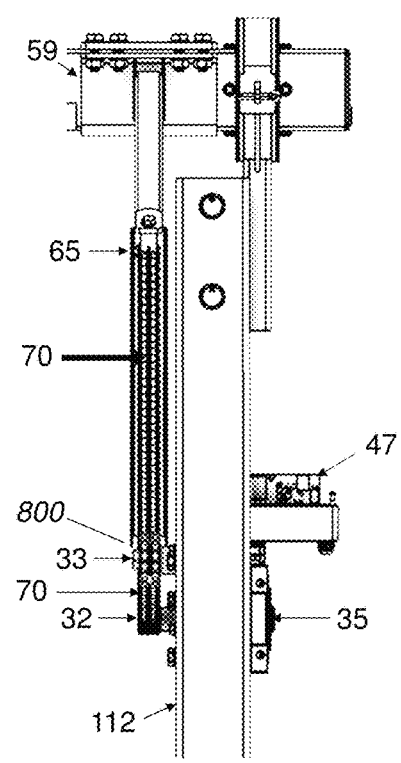

We now refer to FIGS. 8 and 9, both of which are side-view illustrations of the support pylon 120 and the drive system 110 installed thereupon, according to embodiments. Both figures show the central elongated member 59 of the frame subassembly engaged with the top of the hoop portion 65. The hoop portion 65 and drive chain 70 are thus arranged to transfer a torque from the motor assembly 40 to the frame subassembly via the drive shaft 35 and the drive-wheel sprocket 32. The hoop portion 65, of the pivot-wheel assembly along with the drive chain 70, are installed externally to the hollow member 112 and displaced a small distance from the wall 114 of the hollow member 112 that is opposite the open side 113.

In the non-limiting example of FIG. 8, components of the motor assembly 40 are covered by or encased in environmentally isolating housings 48. FIG. 9 is similar in composition to FIG. 8 but shows some components of the drive system 110 that are obscured in FIG. 8. The drive chain 70 leaves the hoop portion 65, and after partly circumscribing the first guide-wheel sprocket $33_1$ (obscured by the second guide-wheel sprocket $33_2$ in FIG. 9), the drive chain 70 then circumscribes, as shown, the lower portion of the drive-wheel sprocket 35. Finally, the drive chain 70 partly circumscribes the second guide-wheel sprocket $33_2$, which is also obscured by the sprocket $33_2$, and returns to the hoop portion 65 approximately at the location indicated in FIG. 9 by line 800.

Referring now to FIG. 10, a method is disclosed for rotating a PV assembly, e.g., the PV assembly 57 of FIG. 1. According to the method, comprising a frame subassembly and an array of PV panels 55 joined thereto and pivotable therewith about a longitudinal axis 900 of the PV assembly 57. As illustrated by the flow chart in FIG. 10, the method comprises at least the 2 method steps S01 and S02:

Step S01 includes: providing:
  a support pylon 120 comprising a hollow member 112 open on a first side 113, and
  a drive system comprising a pivot-wheel assembly comprising a drive chain 70 joined to a hoop portion 65, and (B) a drive-motor assembly 40 at least partly disposed within the hollow member 112 and mounted to a wall 114 thereof, the drive-motor assembly 40 comprising an electric motor 42 and a gearing arrangement in communication therewith and comprising a drive shaft 35 passing through an aperture 36 in the wall 114 so as to be in geared communication with the drive chain 70 via a sprocketed drive wheel 32.

Step S02 includes providing electricity to rotate a component, e.g., a rotor, of the motor 42, wherein the rotating of the component of the motor 42 is effective to rotate the pivot-wheel assembly.

Terms such as 'joined', 'coupled', 'attached', 'mounted' and the like, when used herein, include both indirect and direct joining, coupling, attaching, mounting, etc., unless otherwise specified. It will be appreciated that the above descriptions are intended only to serve as examples, and that many other embodiments are possible within the scope of the present invention and as defined in the appended claims.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A solar energy system comprising:
   a. A photovoltaic (PV) assembly comprising a frame subassembly and an array of PV panels joined thereto and pivotable therewith about a longitudinal axis of the PV assembly;
   b. a support pylon comprising a hollow member open on a first side; and
   c. a drive system comprising (i) a drive-motor assembly comprising an electric motor and a gearing arrangement in communication therewith, and (ii) a pivot-wheel assembly comprising a drive chain joined to a hoop portion, the pivot-wheel assembly arranged to transfer a torque from the electric motor to the frame subassembly,
   wherein (i) the drive-motor assembly is at least partly disposed within the hollow member and mounted to a wall thereof, and (ii) the gearing arrangement comprises a drive shaft passing through an aperture in the wall so as to place the electric motor in geared communication with the drive chain via a sprocketed drive wheel.

2. The solar energy system of claim 1, additionally comprising:
   i. a mounting plate disposed within the hollow member and mediating between the drive-motor assembly and the wall, and
   ii. a plurality of unpowered guide wheels engaged with the drive chain and coupled to the mounting plate via guide-wheel shafts passing through respective apertures in the wall.

3. The solar energy system of claim 1, wherein the wall is opposite the first side.

4. The solar energy system of claim 1, wherein the hollow member comprises a light steel profile.

5. The solar energy system of claim 4, wherein the hollow member comprises one of a C profile and a U profile.

6. The solar energy system of claim 4, wherein the wall has a thickness between 0.8 and 3.5 mm.

7. The solar energy system of claim 4, wherein the wall has a thickness between 1 and 2 mm.

8. The solar energy system of claim 1, wherein a center of mass of the drive-motor assembly is disposed within the hollow member.

9. The solar energy system of claim 1, wherein the electric motor is at least partly disposed within the hollow member.

10. The solar energy system of claim 1, wherein a center of mass of the electric motor is disposed within the hollow member.

11. The solar energy system of claim 1, wherein operation of the electric motor is regulated by a control system installed in an enclosure that is at least partly disposed within the hollow member.

12. An assembly for use in a solar tracker, the assembly comprising:
   a. an elongated hollow support member, open on a first side;
   b. a drive-motor assembly at least partly disposed within the support member and mounted to a wall thereof, the drive-motor assembly comprising an electric motor, a drive shaft and at least one guide-wheel shaft, the shafts passing through respective apertures in the wall so as to connect to respective sprockets disposed outside the support member, the respective sprockets comprising a drive sprocket and at least one guide-wheel sprocket; and
   c. a drive chain engaged with the drive sprocket to be driven thereby and with the at least one guidewheel sprocket to be guided thereby.

13. The assembly of claim 12, wherein the respective apertures have larger diameters than the shafts passing therethrough, and the shafts do not contact the wall.

14. The assembly of claim 12, wherein the drive-motor assembly comprises an even number of guide-wheel shafts disposed symmetrically around a vertical axis of symmetry intersected by a central longitudinal axis of the drive shaft.

15. A method of rotating a PV assembly, the PV assembly comprising a frame subassembly and an array of PV panels joined thereto and pivotable therewith about a longitudinal axis of the PV assembly, the method comprising:
   a. providing (i) a support pylon comprising a hollow member open on a first side, and (ii) a drive system comprising (A) a pivot-wheel assembly comprising a drive chain joined to a hoop portion, and (B) a drive-motor assembly at least partly disposed within the hollow member and mounted to a wall thereof, the drive-motor assembly comprising an electric motor and a gearing arrangement in communication therewith, the gearing arrangement comprising a drive shaft passing through an aperture in the wall so as to be in geared communication with the drive chain via a sprocketed drive wheel; and
   b. providing electricity to rotate the motor, wherein the rotating of the motor causes the pivot-wheel assembly to rotate and transfer a torque to the PV assembly.

* * * * *